United States Patent
McCaffrey

(10) Patent No.: US 11,846,204 B2
(45) Date of Patent: Dec. 19, 2023

(54) CMC BLADE WITH DAMAGE TOLERANT EDGES

(71) Applicant: Raytheon Technologies Corporation, Farmington, CT (US)

(72) Inventor: Michael G. McCaffrey, Windsor, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 17/698,332

(22) Filed: Mar. 18, 2022

(65) Prior Publication Data
US 2023/0296026 A1  Sep. 21, 2023

(51) Int. Cl.
*F01D 5/28* (2006.01)
*F01D 5/14* (2006.01)

(52) U.S. Cl.
CPC ............. *F01D 5/282* (2013.01); *F01D 5/147* (2013.01); *F05D 2230/50* (2013.01); *F05D 2300/6033* (2013.01)

(58) Field of Classification Search
CPC .......... F01D 5/282; F01D 5/284; F01D 5/286
See application file for complete search history.

(56) References Cited

U.S. PATENT DOCUMENTS

| 3,883,267 | A  | * | 5/1975  | Baudier ................. F01D 5/282 416/241 A |
| 11,015,462 | B2 |   | 5/2021  | De Gaillard et al. |
| 11,131,197 | B2 |   | 9/2021  | Courtier et al. |
| 2010/0056006 | A1 | * | 3/2010 | Campbell .............. D03D 11/00 442/205 |
| 2011/0182743 | A1 | * | 7/2011 | Naik ....................... F01D 5/282 29/889.71 |
| 2018/0002238 | A1 | * | 1/2018 | Hockemeyer ..... C04B 35/62884 |

\* cited by examiner

*Primary Examiner* — Woody A Lee, Jr.
*Assistant Examiner* — Cameron A Corday
(74) *Attorney, Agent, or Firm* — Bachman & LaPointe, P.C.

(57) ABSTRACT

A ceramic matrix composite blade includes a central core surrounded by an outer profile, the central core comprising layers of unidirectional layup having two dimension and three dimension fiber weaves; the outer profile comprises a biased weave layup that radiates toward a leading edge and a trailing edge of the blade; wherein the biased weave layup includes fibers that extend proximate an attachment region of the blade radially and axially along an airfoil portion of the blade toward the leading edge and trailing edge.

18 Claims, 6 Drawing Sheets

CMC BLADE WITH DAMAGE TOLERANT EDGES

BACKGROUND

The present disclosure is directed to a ceramic matrix composite (CMC) gas turbine engine blade configured with a structural loading scheme, in particular use of biased weave directional material in the laminate design proximate a core configured to withstand a predetermined radial load in addition to biased weave unidirectional material proximate the leading edge and the trailing edge.

Gas turbine engine blades can be made out of composite material obtained from fiber reinforcement made by three-dimensional weaving and densified with a matrix. Three-dimensional (3D) or multilayer weaving serves to give the composite material blade mechanical strength. Nevertheless, the good mechanical strength imparted by three-dimensional or multilayer weaving is more difficult to obtain in portions of the blade that present small thicknesses, of the order of 1 millimeter (mm) to 2 mm, such as the leading and/or trailing edges of a blade. The leading edge and the trailing edge need to be capable of withstanding or limiting damage when they are subjected to various stresses such as bird strikes or repeated cycles in flight (erosion/lifetime).

What is needed is a composite material blade that exhibits mechanical strength responsive to radial loading as well as being capable of withstanding damage proximate the leading and trailing edges.

SUMMARY

In accordance with the present disclosure, there is provided a ceramic matrix composite blade comprising a central core surrounded by an outer profile, the central core comprising layers of unidirectional layup having two dimension and three dimension fiber weaves; the outer profile comprises a biased weave layup that radiates toward a leading edge and a trailing edge of the blade; wherein the biased weave layup includes fibers that extend proximate an attachment region of the blade radially and axially along an airfoil portion of the blade toward the leading edge and trailing edge.

A further embodiment of any of the foregoing embodiments may additionally and/or alternatively include the unidirectional layup comprises unidirectional fibers with 30-50% fibrous reinforcement.

A further embodiment of any of the foregoing embodiments may additionally and/or alternatively include the biased weave layup fibers are attached from a concave side of the blade around the leading edge to a convex side of the blade.

A further embodiment of any of the foregoing embodiments may additionally and/or alternatively include the biased weave layup fibers are attached from a convex side of the blade around the leading edge to a concave side of the blade.

A further embodiment of any of the foregoing embodiments may additionally and/or alternatively include the biased weave layup fibers are attached to extend from an attachment region radially and axially over an airfoil of the blade to a trailing edge of the blade.

A further embodiment of any of the foregoing embodiments may additionally and/or alternatively include the biased weave layup fibers are angled from a zero degree direction.

A further embodiment of any of the foregoing embodiments may additionally and/or alternatively include the angle from the zero degree direction ranges from about 30 degrees to about 60 degrees.

A further embodiment of any of the foregoing embodiments may additionally and/or alternatively include the biased weave layup includes an angle relative to the zero degree direction with respect to a camber line of the blade from the leading edge to the trailing edge.

A further embodiment of any of the foregoing embodiments may additionally and/or alternatively include the ceramic matrix composite blade further comprising a first edge portion of the outer profile from about 20 percent of the camber line proximate the leading edge comprises an angle that ranges from about 30 degrees to about 60 degrees from the zero degree direction.

A further embodiment of any of the foregoing embodiments may additionally and/or alternatively include the ceramic matrix composite blade further comprising a second edge portion of the outer profile from about 25 percent of the camber line proximate the trailing edge comprises an angle that ranges from about 30 degrees to about 60 degrees angle from the zero degree direction.

A further embodiment of any of the foregoing embodiments may additionally and/or alternatively include the ceramic matrix composite blade further comprising a middle portion of the outer profile located between the first edge portion and the second edge portion comprises about 45 percent to 60 percent of the camber line and includes an angle that ranges from about 15 degrees to about 30 degrees angle from the zero degree direction.

A further embodiment of any of the foregoing embodiments may additionally and/or alternatively include an arrangement of the biased weave layup fibers are angled to obtain a predetermined load profile in each of the first edge region, second edge region and middle region.

A further embodiment of any of the foregoing embodiments may additionally and/or alternatively include the outer profile includes a structure in the biased weave layup that extends radially and spirals around contours of the airfoil at a predetermined angle, allowing a predetermined leading edge and trailing edge radii with predetermined fiber bend radii.

In accordance with the present disclosure, there is provided a process for reducing damage to a ceramic matrix composite blade comprising forming a central core, the central core comprising layers of unidirectional layup having two dimension and three dimension fiber weaves; forming an outer profile around the central core; and forming within the outer profile a biased weave layup that radiates toward a leading edge and a trailing edge of the blade; wherein the biased weave layup includes fibers that extend proximate an attachment region of the blade radially and axially along an airfoil portion of the blade toward the leading edge and trailing edge.

A further embodiment of any of the foregoing embodiments may additionally and/or alternatively include the process further comprising attaching the biased weave layup fibers from a concave side of the blade around the leading edge to a convex side of the blade; attaching the biased weave layup fibers from the convex side of the blade around the leading edge to the concave side of the blade; and attaching the biased weave layup fibers to extend from an attachment region radially and axially over an airfoil of the blade to a trailing edge of the blade.

A further embodiment of any of the foregoing embodiments may additionally and/or alternatively include the biased weave layup fibers are angled from a zero degree direction.

A further embodiment of any of the foregoing embodiments may additionally and/or alternatively include the biased weave layup includes an angle relative to the zero degree direction with respect to a camber line of the blade from the leading edge to the trailing edge.

A further embodiment of any of the foregoing embodiments may additionally and/or alternatively include the process further comprising forming a first edge portion of the outer profile from about 20 percent of the camber line proximate the leading edge comprising the angle that ranges from about 30 degrees to about 60 degrees from the zero degree direction.

A further embodiment of any of the foregoing embodiments may additionally and/or alternatively include the process further comprising forming a second edge portion of the outer profile from about 25 percent of the camber line proximate the trailing edge comprising the angle that ranges from about 30 degrees to about 60 degrees angle from the zero degree direction.

A further embodiment of any of the foregoing embodiments may additionally and/or alternatively include the process further comprising forming a middle portion of the outer profile located between the first edge portion and the second edge portion comprises about 45 percent to 60 percent of the camber line and includes an angle that ranges from about 15 degrees to about 30 degrees angle from the zero degree direction.

Other details of the composite blade are set forth in the following detailed description and the accompanying drawings wherein like reference numerals depict like elements.

DETAILED DESCRIPTION

Figure 1:
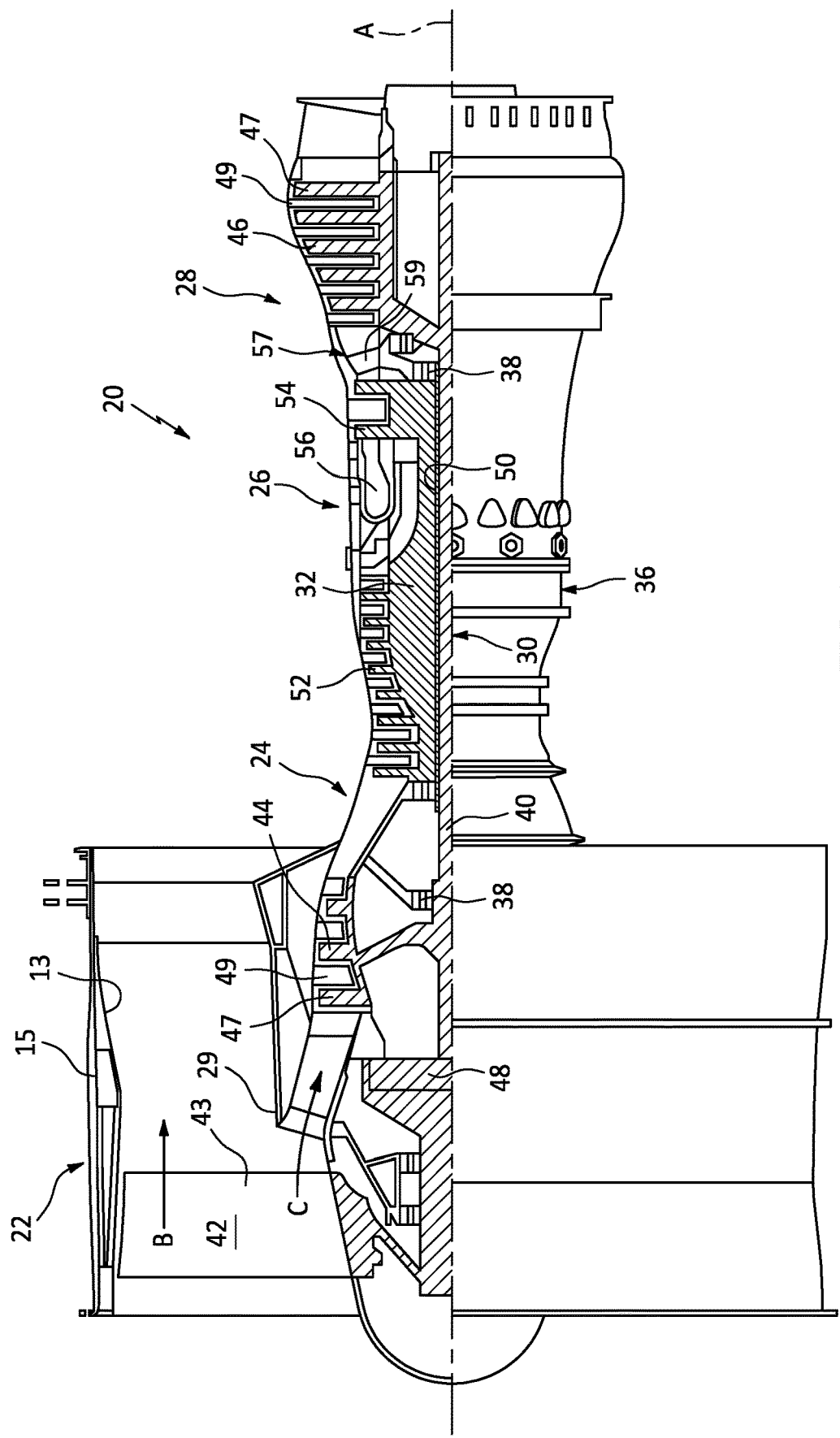
FIG. 1 is a schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 feet (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(Tram\ °\ R)/(518.7°\ R)]^{0.5}$. The "low corrected fan tip speed" can be less than or equal to 1150.0 ft/second (350.5 meters/second), and greater than or equal to 1000.0 ft/second (304.8 meters/second).

Figure 2:
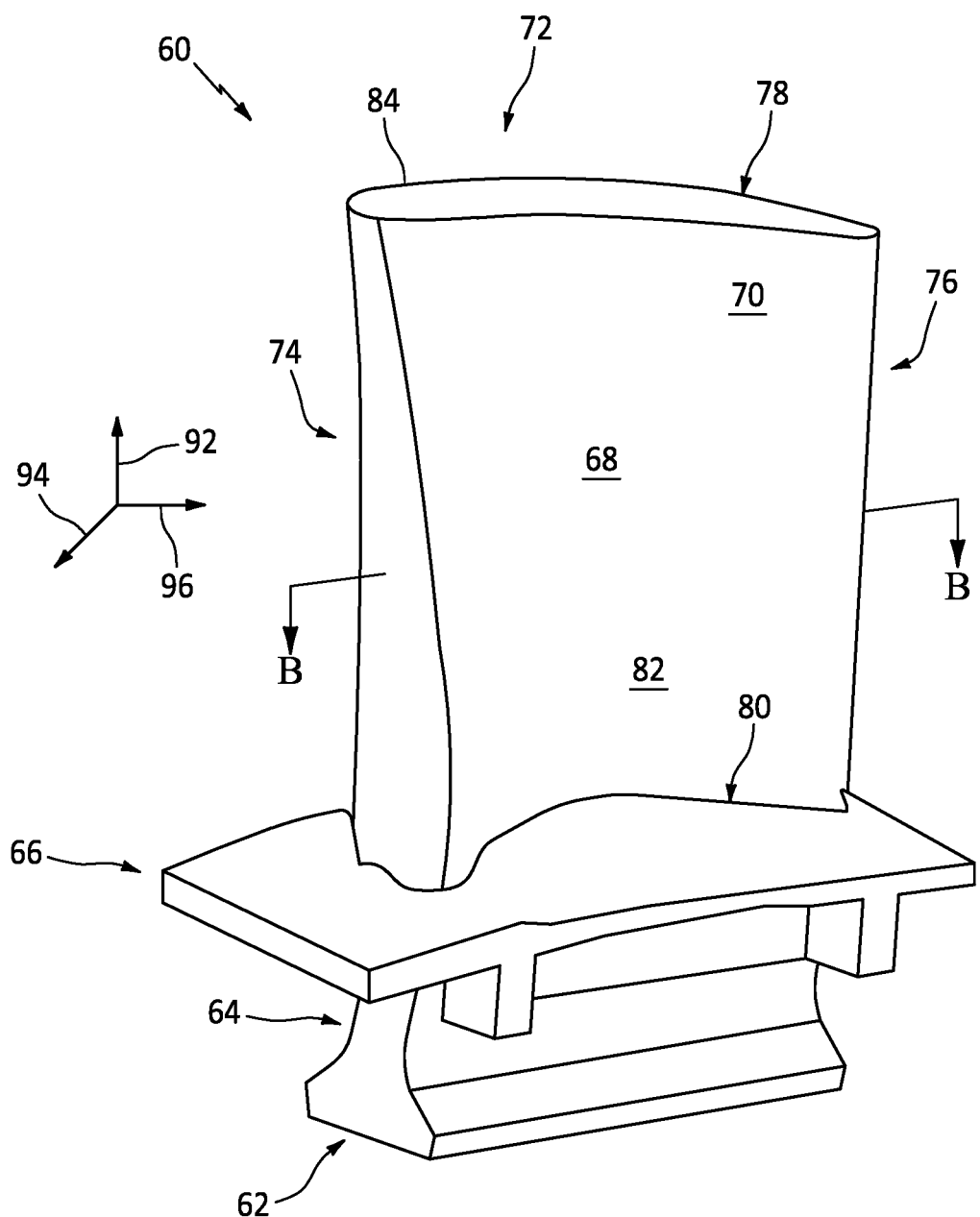
FIG. 2 is a schematic of an exemplary composite blade.

Referring also to FIG. 2, an exemplary composite blade is shown. It is noted that the exemplary composite blade is described, a vane can also include the material composition. Although the blade 60 is illustrated, the disclosure applies to all types of components made from a composite material and is not limited to the composite blade 60 illustrated. The blade 60 can be a ceramic matrix composite (CMC) gas turbine engine blade. The blade 60 includes an attachment or root portion 62 with a neck 64. The neck 64 is not located in the hot working fluid flow path. The blade 60 is coupled with a turbine disk (not shown) proximate the root 62. The blade includes a platform region, specifically a platform 66 disposed along an upper portion of the neck 64. The platform region 66 defines the flowpath that separates the hot working fluid from the cooler working fluid proximate the neck 64. The blade 60 further includes an airfoil 68 located opposite the root 62 relative to the platform 66 and extending radially outward from the platform 66. The airfoil 68 includes a concave side 70 and an oppositely facing convex side 72. The blade 60 includes an axially leading edge 74, an axially trailing edge 76, a radially outer side 78 and a radially inner side 80, and an axially central portion 82. The blade tip 84 is opposite the blade root 62.

Figure 3:
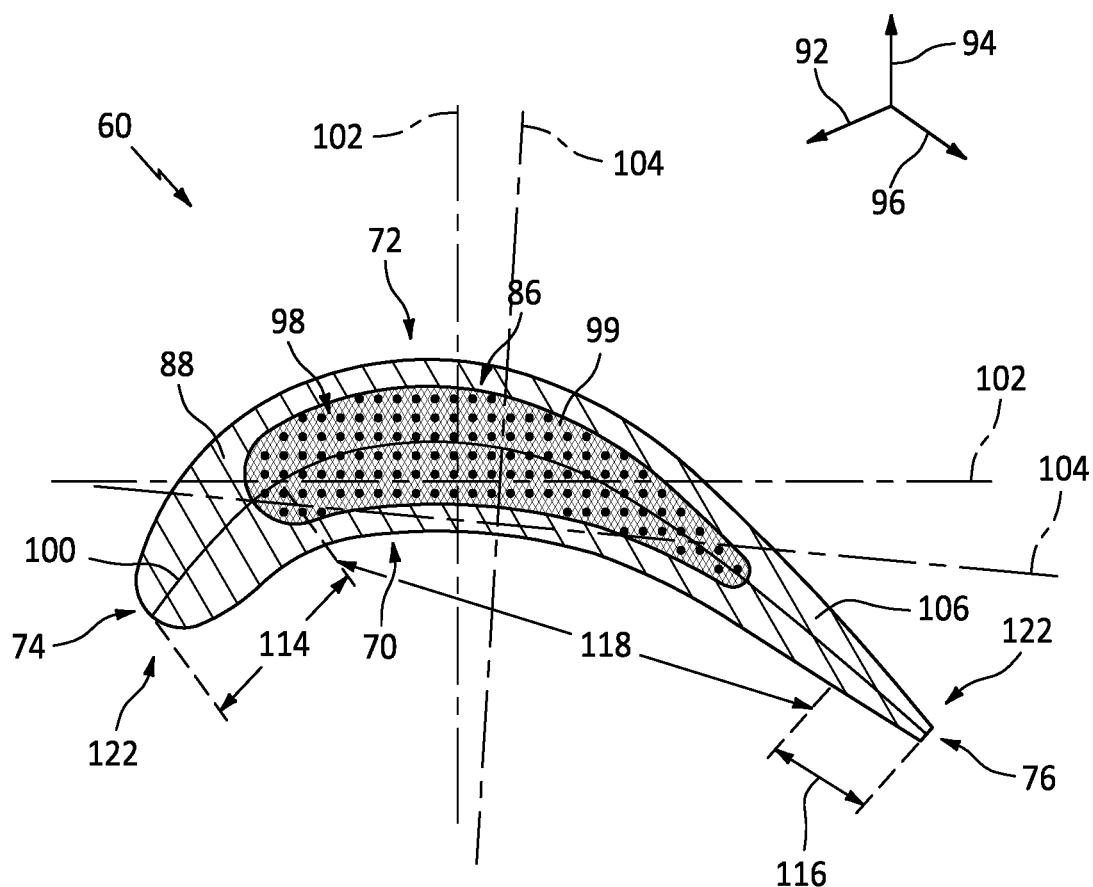
FIG. 3 is a schematic cross sectional plan view of an exemplary composite blade.
Figure 4:
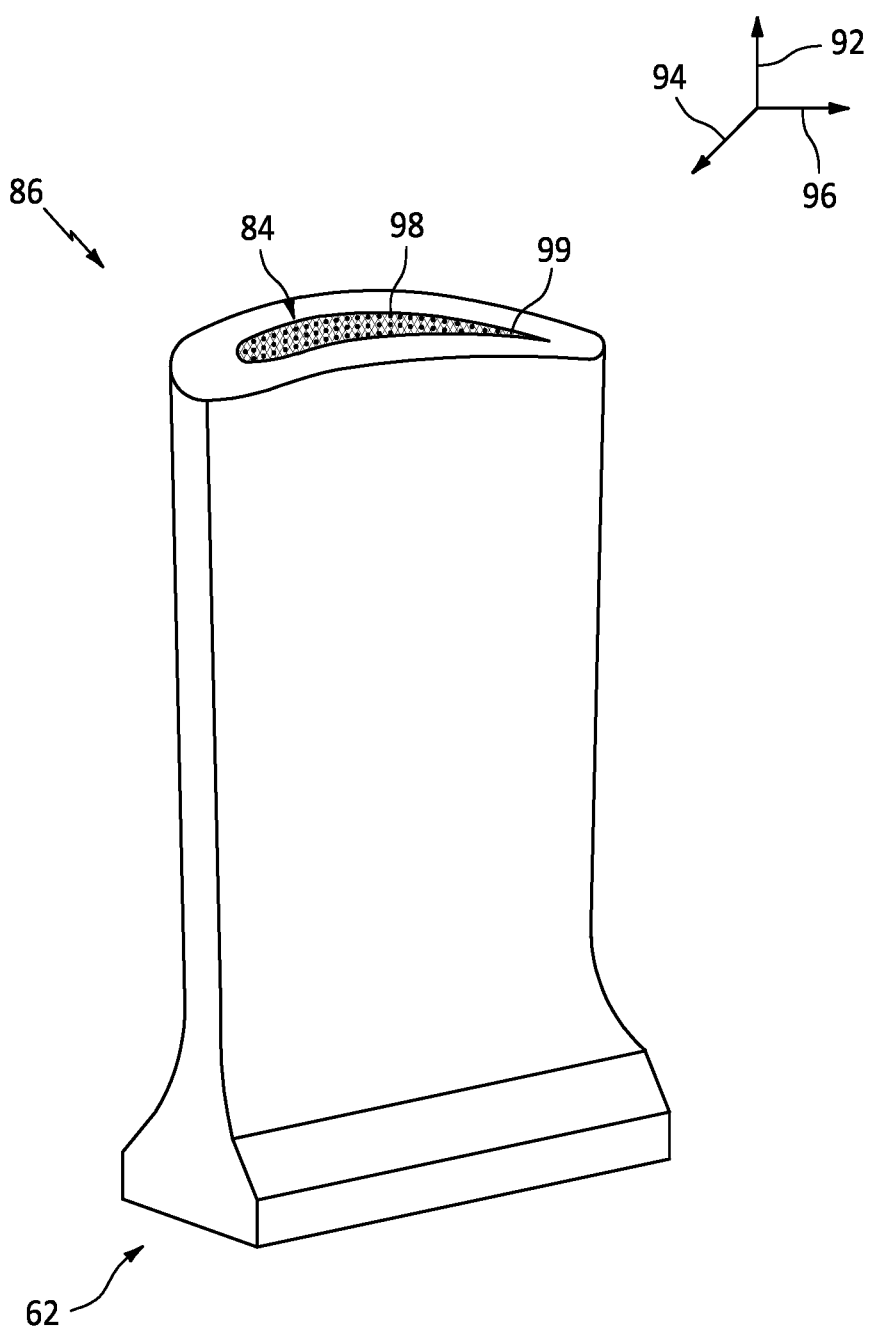
FIG. 4 is a schematic representation of exemplary composite blade core layers.
Figure 5:
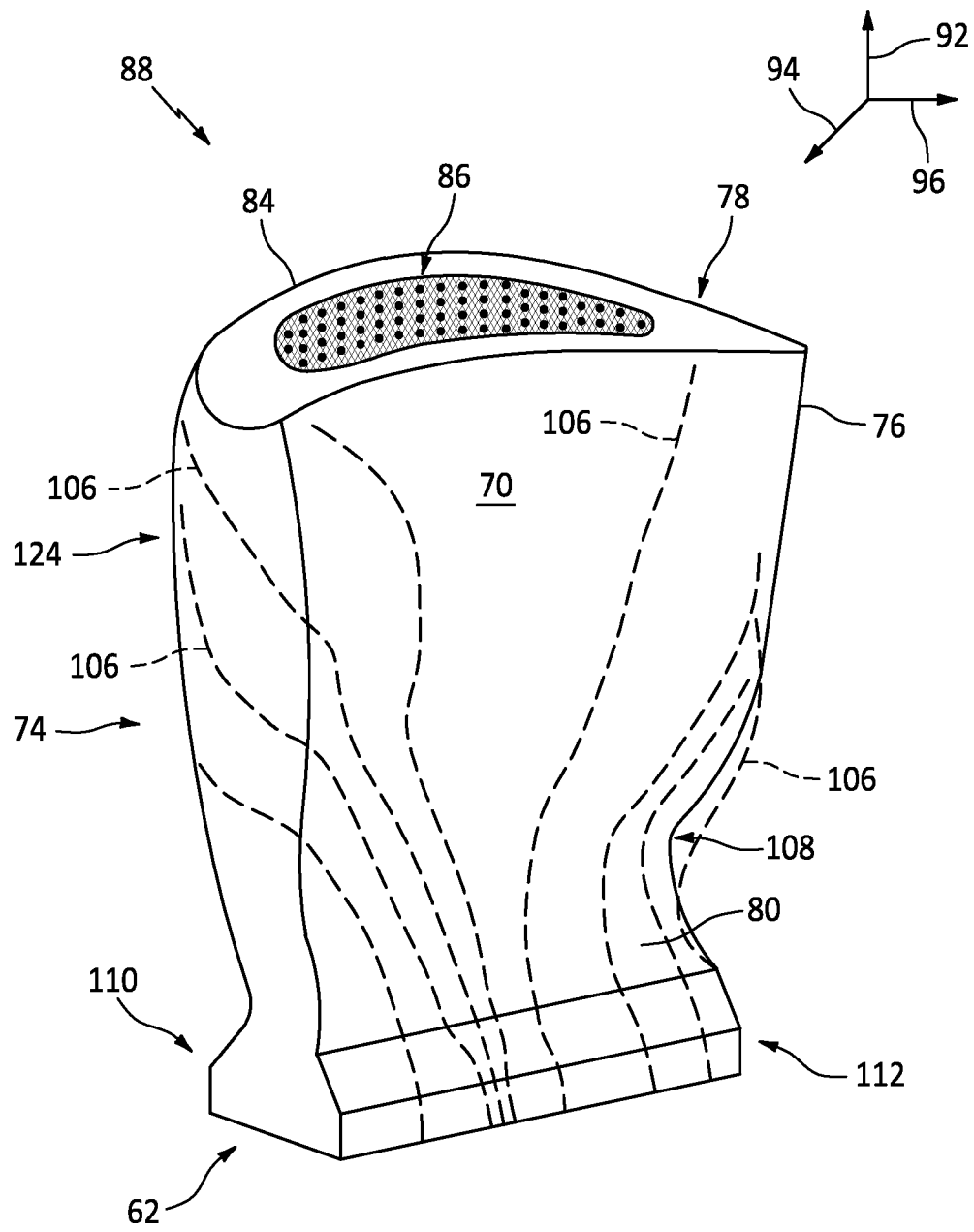
FIG. 5 is a schematic representation of exemplary composite blade outer profile layers.

Referring also to FIGS. 3, 4 and 5, the schematic cross sectional plan view of an exemplary composite blade 60 is shown at FIG. 3. The cross section is cut through B-B of FIG. 1. The blade 60 includes a central core 86 surrounded by an outer profile 88.

The central core 60 can be made up of layers of unidirectional layup 90, two dimension, and three dimension weaves. The unidirectional layup 90 is strongest when loaded in the zero direction (0 degree direction), and the weakest when loaded in the ninety degree direction (90 degree direction). The zero degree direction 92 is along the radial direction (coming out of the page) shown in FIG. 3 that can include a range from −5 degrees to 0 degrees and/or 0 degrees to 5 degrees in the radial direction. The 90 degree direction 94 is along the direction orthogonal and/or substantially orthogonal to the zero degree direction 92, as shown coming out of the page. The 90 degree direction can range from 85 degrees to 95 degrees in a direction orthogonal/substantially orthogonal to the zero degree direction 92. The axial direction 96 is generally indicated. The unidirectional layup 90 can comprise mostly unidirectional fibers 98 with 30-50% fibrous reinforcement 99 "fiber fraction", as in the percent of the volume of a given region that is fiber. The remaining percent of a given volume consists of matrix+ voids. Fibrous reinforcement 99 is achieved by three-dimensional weaving on a jacquard-type loom. During weaving, warp yarn bundles (or warp strands) are disposed in several layers of several hundred yarns each. Weft yarns (or weft strands) are interlaced with the warp yarns so as to bind the various layers of warp yarns together. The three-dimensional weaving is a weaving with an "interlock" pattern. By "interlock" is meant a weaving pattern in which each layer of weft yarns binds several layers of warp yarns with all the yarns of the same weft column having the same movement in the plane of the pattern. Other types of known three-dimensional weavings may be used.

The blade 60 includes a camber line 100 that defines the locus of the mid-points between the concave side 70 and convex side 72 surfaces when measured perpendicular to the camber line 100. In this disclosure, the camber line 100 is being used to indicate general locations of various layups of fibers. The blade 60 also defines a stiffness neutral axis 102 and a geometric neutral axis 104 as shown at FIG. 3.

The geometric neutral axis 104 describes the distribution of the airfoil section, relative to the radial "stacking line." When airfoils are designed, the radial pull of the outermost sections must be supported by the successive inner sections. The opposite of a layer cake, you start at the tip 84, and stack the airfoil 68 sections under the outer portions, as needed to carry the load, with the desired stress states. What happens when one uses a stiff core 86 and a softer shell outer profile 88, is the location of the core 86, needed to support whole airfoil 68 is no longer in the geometric center 104. Plus, the core 86 shape is somewhat limited by the thickness of the shell 88, and the resulting core section 86 is less airfoil-like and more like a curved beam. A different approach has to be taken to locate the central core 86, such that the radial pull and the bending is balanced to create a stress state that does two things, sets the core 86 within allowable stress levels, and in the case of the shell 88, intentionally drive the shell 88 into as much compression as possible. With the shell 88 leading edge 74 and trailing edge 76 in compression, and most of the shell 88 at low stress, the ability to be damaged, without overloading the core 86 is increased.

The descriptive method for locating the airfoil 68 is the section neutral axis 102. But with the core 86 and shell 88 approach, the location of the geometric centroid and the structural centroid are no longer the same. The idea is to give guidance on where to locate the core 86 section, to get maximum benefit. Put as much load in the core 86, with good stress distribution. Unload the shell 88, but more importantly, make the stress state such that damage has a much lower risk of initiating a blade fracture.

The leading edge 74 and trailing edge 76 are located farther from the stiffness neutral axis 102 but have a lower stress due to a lower modulus.

The outer profile 88 can include biased weave layup 106 that radiates toward the leading edge 74 and trailing edge 76. The outer profile 88 can include a low radial stiffness component. The outer profile 88, in an exemplary embodiment can have a Young's modulus of 70% to 30% of the central core 86.

As seen in FIG. 5, the outer profile 88 includes the biased weave layup 106 fibers that extend proximate the attachment region 62 radially and axially along the airfoil portion 68 toward the leading edge 74 and trailing edge 76. The biased weave layup 106 fibers can be wrapped from the convex side 72 around the leading edge 74 to the concave side 70. The biased weave layup 106 fibers can be wrapped from the concave side 70 around the leading edge 74 to the convex side 72. The biased weave layup 106 fibers can also be wrapped to extend from the attachment region 62 radially and axially over the airfoil 68 to the trailing edge 76. The biased weave layup 106 can be arranged to extend from the radially inner side 78 to the radially outer side 78. The load carried by the outer profile 88 can be angled radially into the attachment region 62. Fibers of the biased weave layup 106 in the center of the camber line support the tip 84. Fibers of the biased weave layup 106 near the forward region 110 and after region 112 of the attachment region 62 support the neck 64.

The unique biased weave layup 106 in the outer profile 88 provides damage protection to the leading edge 74 and trailing edge 76 portions of the blade 60. The impact damage 108 from an object (not shown) striking the leading edge 74 or trailing edge 76 can be mitigated due to the unique biased weave layup 106. The outer profile 88 includes a structure in the outer weave profile 88 that flows radially and spirals around the contours of the airfoil at a steep angle, allowing a predetermined leading edge 74 and trailing edge 76 radii 122 with predetermined fiber bend radii 124. The radii 124 can be less than 0.020" trailing edge radii. Ceramic fiber bundles reach a limit around 0.06-0.1" radius, where bending any smaller results in large scale breakage. With a spiral wrap in the fiber, it will bend far less than the planer section radius. Impact damage 108 proximate the platform region 66 does not affect fibers of the biased weave layup 106 supporting airfoil portions proximate the tip 84, because they are closer to the mid-chord of the blade 60.

Referring again to FIG. 3, the biased weave layup 106 fibers can be angled from the zero degree direction 92. In an exemplary embodiment, the angle from the zero degree direction 92 can range from about 30 degrees to about 60 degrees. In an exemplary embodiment, the angle from the zero degree direction 92 can range from about 45 degrees. The biased weave layup 106 can vary the angle relative to the zero degree direction 92 relative to the camber line 100 from leading edge 74 to trailing edge 76. In an exemplary embodiment, a first edge portion 114 of the outer profile 88 from about 20 percent of the camber line 100 proximate the leading edge 74 can include an angle that ranges from about 30 degrees to about 60 degrees angle from the zero degree direction 92. A second edge portion 116 of the outer profile 88 from about 25 percent of the camber line 100 proximate the trailing edge 76 can include an angle that ranges from about 30 degrees to about 60 degrees angle from the zero degree direction 92. A middle portion 118 of the camber line 100 located between the first edge portion 114 and second edge portion 116 and including about 45 percent to 60 percent of the camber line 100 can include an angle that ranges from about 15 degrees to about 30 degrees angle from the zero degree direction 92. The arrangement of the biased weave layup 106 fibers can be angled to obtain a predetermined load profile 120 in the various first edge region 114, second edge region 116 and middle region 118.

Figure 6:
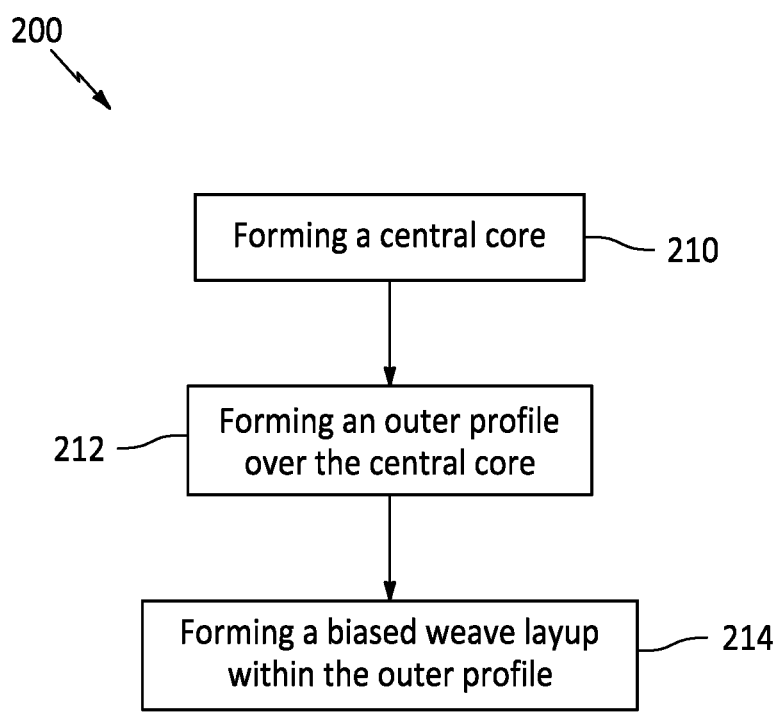
FIG. 6 is a process flow diagram of the exemplary process.

Referring to FIG. 6 a process diagram 200. The first step 210 in the process 200 includes forming a central core 86. The central core 86 comprises layers of unidirectional layup 98 having two dimension and three dimension fiber weaves. The next step 212 in the process includes forming an outer profile 88 over the central core 86. The next step 214 includes installing biased weave layup 106 within the outer profile 88. The biased weave layup 106 radiates toward a leading edge 74 and a trailing edge 76 of the blade 60. The biased weave layup 106 includes fibers that extend proximate an attachment region 62 of the blade 60 radially and axially along an airfoil portion 68 of the blade 60 toward the leading edge 74 and trailing edge 76. The process 200 can further include attaching the biased weave layup fibers 106 from a concave side 70 of the blade 60 around the leading edge 74 to a convex side 72 of the blade 60. The process 200 can further include attaching the biased weave layup fibers 106 from the convex side 72 of the blade 60 around the leading edge 74 to the concave side 70 of the blade 60. The process can further include attaching the biased weave layup fibers 106 to extend from an attachment region 62 radially and axially over an airfoil 68 of the blade 60 to a trailing edge 76 of the blade 60. The biased weave layup 106 includes an angle relative to the zero degree direction 92 with respect to a camber line 100 of the blade from the leading edge 74 to the trailing edge 76. The process 200 can further include forming a first edge portion 114 of the outer profile 88 from about 20 percent of the camber line 100 proximate the leading edge 74 comprising said angle that ranges from about 30 degrees to about 60 degrees from the zero degree direction 92. The process 200 can further include forming a second edge portion 116 of the outer profile 88 from about 25 percent of the camber line 100 proximate the trailing edge 76 comprising the angle that ranges from about 30 degrees to about 60 degrees angle from the zero degree direction 92. The process 200 can further include forming a middle portion 118 of the outer profile 88 located between the first edge portion 114 and the second edge portion 116 that comprises about 45 percent to 60 percent of the camber line 100 and includes an angle that ranges from about 15 degrees to about 30 degrees angle from the zero degree direction 92.

A technical advantage of the disclosed composite blade layup can include leading and trailing edges that are more tolerant to damage, because the stress state at the edges is low enough that stress concentrations created by damage do not overload the edges.

A technical advantage of the disclosed composite blade layup can include an airfoil composite weave layup and structural loading scheme which creates low stresses in the critical leading edge and trailing edge regions of the blade.

A technical advantage of the disclosed composite blade layup can include an airfoil composite layup the focuses stiffness distribution and balance, thus unloading the leading and trailing edges.

A technical advantage of the disclosed composite blade layup can include an airfoil composite layup that can tolerate a defect at the leading edge or trailing edge.

A technical advantage of the disclosed composite blade layup can include the capacity to keep the stress below a proportional limit by use of stiffness and the use of center of gravity to reduce the stress at the leading edge and the trailing edge.

There has been provided a composite blade. While the composite blade has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A ceramic matrix composite blade comprising:
   a central core surrounded by an outer profile, said central core comprising layers of unidirectional layup having two dimension and three dimension fiber weaves; said outer profile comprises a biased weave layup that radiates toward a leading edge and a trailing edge of the blade; wherein said biased weave layup includes fibers that extend proximate an attachment region of the blade radially and axially along an airfoil portion of the blade toward the leading edge and trailing edge; wherein said biased weave layup fibers are at least one of:
   attached from a concave side of the blade around the leading edge to a convex side of the blade;
   attached from a convex side of the blade around the leading edge to a concave side of the blade.

2. The ceramic matrix composite blade according to claim 1, wherein said unidirectional layup comprises unidirectional fibers with 30-50% fibrous reinforcement.

3. The ceramic matrix composite blade according to claim 1, wherein said biased weave layup fibers are attached to extend from an attachment region radially and axially over an airfoil of the blade to a trailing edge of the blade.

4. The ceramic matrix composite blade according to claim 1, wherein said biased weave layup fibers are angled from a zero degree direction.

5. The ceramic matrix composite blade according to claim 4, wherein the angle from the zero degree direction ranges from about 30 degrees to about 60 degrees.

6. The ceramic matrix composite blade according to claim 4, wherein said biased weave layup includes an angle relative to the zero degree direction with respect to a camber line of the blade from the leading edge to the trailing edge.

7. The ceramic matrix composite blade according to claim 6, further comprising:
   a first edge portion of the outer profile from about 20 percent of the camber line proximate the leading edge comprises an angle that ranges from about 30 degrees to about 60 degrees from the zero degree direction.

8. The ceramic matrix composite blade according to claim 7, further comprising:
   a second edge portion of the outer profile from about 25 percent of the camber line proximate the trailing edge comprises an angle that ranges from about 30 degrees to about 60 degrees angle from the zero degree direction.

9. The ceramic matrix composite blade according to claim 8, further comprising:
   a middle portion of the outer profile located between the first edge portion and the second edge portion comprises about 45 percent to 60 percent of the camber line and includes an angle that ranges from about 15 degrees to about 30 degrees angle from the zero degree direction.

10. The ceramic matrix composite blade according to claim 9, wherein an arrangement of the biased weave layup fibers are angled to obtain a predetermined load profile in each of the first edge region, second edge region and middle region.

11. The ceramic matrix composite blade according to claim 1, wherein said outer profile includes a structure in the biased weave layup that extends radially and spirals around contours of the airfoil at a predetermined angle, allowing a predetermined leading edge and trailing edge radii with predetermined fiber bend radii.

12. A process for reducing damage to a ceramic matrix composite blade comprising:
   forming a central core, said central core comprising layers of unidirectional layup having two dimension and three dimension fiber weaves;
   forming an outer profile around the central core;
   forming within said outer profile a biased weave layup that radiates toward a leading edge and a trailing edge of the blade; wherein said biased weave layup includes fibers that extend proximate an attachment region of the blade radially and axially along an airfoil portion of the blade toward the leading edge and trailing edge;
   attaching said biased weave layup fibers from a concave side of the blade around the leading edge to a convex side of the blade;
   attaching said biased weave layup fibers from the convex side of the blade around the leading edge to the concave side of the blade; and
   attaching said biased weave layup fibers to extend from an attachment region radially and axially over an airfoil of the blade to a trailing edge of the blade.

13. The process of claim 12, wherein said biased weave layup fibers are angled from a zero degree direction.

14. The process of claim 13, wherein said biased weave layup includes an angle relative to the zero degree direction with respect to a camber line of the blade from the leading edge to the trailing edge.

15. The process of claim 14, further comprising:
   forming a first edge portion of the outer profile from about 20 percent of the camber line proximate the leading edge comprising said angle that ranges from about 30 degrees to about 60 degrees from the zero degree direction.

16. The process of claim 14, further comprising:
   forming a second edge portion of the outer profile from about 25 percent of the camber line proximate the trailing edge comprising said angle that ranges from about 30 degrees to about 60 degrees angle from the zero degree direction.

17. The process of claim 14, further comprising:

forming a middle portion of the outer profile located between the first edge portion and the second edge portion comprises about 45 percent to 60 percent of the camber line and includes an angle that ranges from about 15 degrees to about 30 degrees angle from the zero degree direction.

18. A ceramic matrix composite blade comprising:

a central core surrounded by an outer profile, said central core comprising layers of unidirectional layup having two dimension and three dimension fiber weaves; said outer profile comprises a biased weave layup that radiates toward a leading edge and a trailing edge of the blade; wherein said biased weave layup includes fibers that extend proximate an attachment region of the blade radially and axially along an airfoil portion of the blade toward the leading edge and trailing edge, wherein said outer profile includes a structure in the biased weave layup that extends radially and spirals around contours of the airfoil at a predetermined angle, allowing a predetermined leading edge and trailing edge radii with predetermined fiber bend radii.

\* \* \* \* \*